(12) United States Patent
Ban et al.

(10) Patent No.: US 8,219,784 B2
(45) Date of Patent: Jul. 10, 2012

(54) ASSIGNING AND PRE-DECODING GROUP ID AND TAG ID PRIOR TO DISPATCHING INSTRUCTIONS IN OUT-OF-ORDER PROCESSOR

(75) Inventors: Oliver Keren Ban, Austin, TX (US); Xiangang Cheng, Shenzhen (CN); Liang Huang Lee, Singapore (SG); Katherine June Pearsall, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 12/330,969

(22) Filed: Dec. 9, 2008

(65) Prior Publication Data
US 2010/0146247 A1 Jun. 10, 2010

(51) Int. Cl.
*G06F 9/38* (2006.01)
(52) U.S. Cl. ............................................ 712/23; 712/214
(58) Field of Classification Search .................. None
See application file for complete search history.

(56) References Cited

U.S. PATENT DOCUMENTS

| | | | |
|---|---|---|---|
| 5,560,028 A * | 9/1996 | Sachs et al. | 712/23 |
| 5,826,070 A * | 10/1998 | Olson et al. | 712/222 |
| 5,930,491 A * | 7/1999 | Hilgendorf et al. | 712/209 |
| 5,978,896 A | 11/1999 | Kahle et al. | |
| 6,212,621 B1 * | 4/2001 | Mahalingaiah | 712/212 |
| 6,553,480 B1 * | 4/2003 | Cheong et al. | 712/23 |
| 6,654,869 B1 | 11/2003 | Kahle et al. | |
| 7,660,969 B2 | 2/2010 | Jensen et al. | |
| 2002/0035677 A1 | 3/2002 | Sheaffer | |
| 2003/0135714 A1 | 7/2003 | Sheaffer | |
| 2005/0228973 A1 | 10/2005 | Wang et al. | |
| 2007/0113053 A1 | 5/2007 | Jensen et al. | |

OTHER PUBLICATIONS

Brehob et al., "Beyond RISC—The Post-RISC Architecture", pp. 1-12, retrieved Oct. 22, 2007 http://www.cse.msu/~enbody/postrisc/postrisc2.htm.

* cited by examiner

*Primary Examiner* — Kenneth Kim
(74) *Attorney, Agent, or Firm* — Yee & Associates, P.C.; Steven L. Bennett

(57) ABSTRACT

A computer-implemented method and apparatus for managing an out of order dispatched instruction queue in a microprocessor. In one embodiment, the method and apparatus include assigning a group identification number and a target identification number to an instruction in an instruction stream. The group identification number and the target identification number are labeled inside an instruction fetcher unit. The group identification number and the target identification number are pre-decoded. The instruction is sent to an instruction queue. The instruction is re-ordered in the instruction stream after executing the instruction utilizing information from the pre-decoding of the group identification number and the target identification number.

7 Claims, 4 Drawing Sheets

400

```
// // By pass to avoid the check point logic Put new instructions onto the busses single dispatch mode
   if (IFU _SingleDispatch.intValue()) {// no instruction in the dispatch queue
      if ((_inst_counter == 0) && IFU _AlwaysDispatching.intValue()) {
         happend = 0; // mark still no real instruction has been dispatched issue a BRANCH_TO_SELF instruction
         _inst = BRANCH_TO_SELF; inst0 = _inst; // invalidate all 3 buses
         iq_holds.put(DISP_1); iq_holds_.put(DISP_1N);
         iq_fp_op.put(DISP_1N); iq_fp_op_.put(DISP_1);
         iq_needs_iit.put(DISP_0N); iq_needs_iit_.put(DISP_0); // actually BRANCH_TO_SELF instruction has been
dispatched
         _tid_cnt += 1; _gid_cnt += 1; // onto bus 0
         _inst1_v = 0; _inst2_v = 0;
         put_instruction(DISP_BUS_ONE, inst0, _tid_cnt, _gid_cnt, DISP_BUS_ZERO); // _inst_counter is NOT decreamented
         return happend; }
      else if (_inst_counter == 0) { // no instruction in the dispatch queue
         happend = 0;              // invalidate all 3 buses
         put_instruction(DISP_BUS_ZERO, _inst, _tid_cnt, _gid_cnt, DISP_BUS_ZERO); // actually no instruction has been
dispatched
         return happend; }
```

```
else {     // multiple dispatch mode
    switch (VEU_room)
    {      // look at VEQ availability
       case (0):   // invalidate all 3 buses
             happend = _IQ.numberOfElements();        // check
       put_instruction(DISP_BUS_ZERO, _inst, DISP_BUS_ZERO, DISP_BUS_ZERO, DISP_BUS_ZERO);
                      // mixing with fix point instructions: 3
       if (IFU _MixWithFixInstructions.intValue()) {
             position = put_fix(DISP_BUS_THREE, _inst, _tid_cnt, _gid_cnt); }    break;
       case (1):
             happend = _IQ.numberOfElements();        // check
       if ((_inst_counter == 0) | !_IQ.numberOfElements()) { // no instruction in the dispatch queue invalidate all 3 buses
       put_instruction(DISP_BUS_ZERO, _inst, _tid_cnt, _gid_cnt, DISP_BUS_ZERO); // mixing with fix point instructions: 3
       if (IFU _MixWithFixInstructions.intValue()) { position = put_fix(DISP_BUS_THREE, _inst, _tid_cnt, _gid_cnt); }
       }
```

FIG. 4

ASSIGNING AND PRE-DECODING GROUP ID AND TAG ID PRIOR TO DISPATCHING INSTRUCTIONS IN OUT-OF-ORDER PROCESSOR

BACKGROUND OF THE ILLUSTRATIVE EMBODIMENTS

1. Field of the Illustrative Embodiments

The present illustrative embodiments relate generally to a method and system for dispatching instructions in a microprocessor. Still more particularly, the illustrative embodiments are directed to a more efficient method and system for managing out of order instruction streams.

2. Description of the Related Art

A typical super scalar processor is a complicated concurrent operation machine. A disadvantage with the current method of operation is keeping order of the dispatched sequence between the dispatched and executed instruction stream, especially if the super scalar machine is involved with an out of order dispatched instruction stream. Traditional solutions do not provide adequate approaches for the issuing and managing of instructions in super-scalar microprocessors.

BRIEF SUMMARY OF THE ILLUSTRATIVE EMBODIMENTS

The illustrative embodiments provide a computer-implemented method and apparatus for managing an out of order dispatched instruction queue in a microprocessor. In one embodiment, the method and apparatus include assigning a group identification number and a target identification number to an instruction in an instruction stream. The group identification number and the target identification number are labeled inside an instruction fetcher unit. The group identification number and the target identification number are pre-decoded. The instruction is sent to an instruction queue. The instruction is re-ordered in the instruction stream after executing the instruction utilizing information from the pre-decoding of the group identification number and the target identification number.

BRIEF DESCRIPTION OF THE SEVERAL VIEWS OF THE DRAWINGS

The novel features believed characteristic of the illustrative embodiments are set forth in the appended claims. The illustrative embodiments itself, however, as well as a preferred mode of use, further objectives and advantages thereof, will best be understood by reference to the following detailed description of an illustrative embodiment when read in conjunction with the accompanying drawings, wherein:

FIG. 4 is an illustrative algorithm for implementing the method described in accordance with an illustrative embodiment.

DETAILED DESCRIPTION OF THE ILLUSTRATIVE EMBODIMENTS

Figure 1:
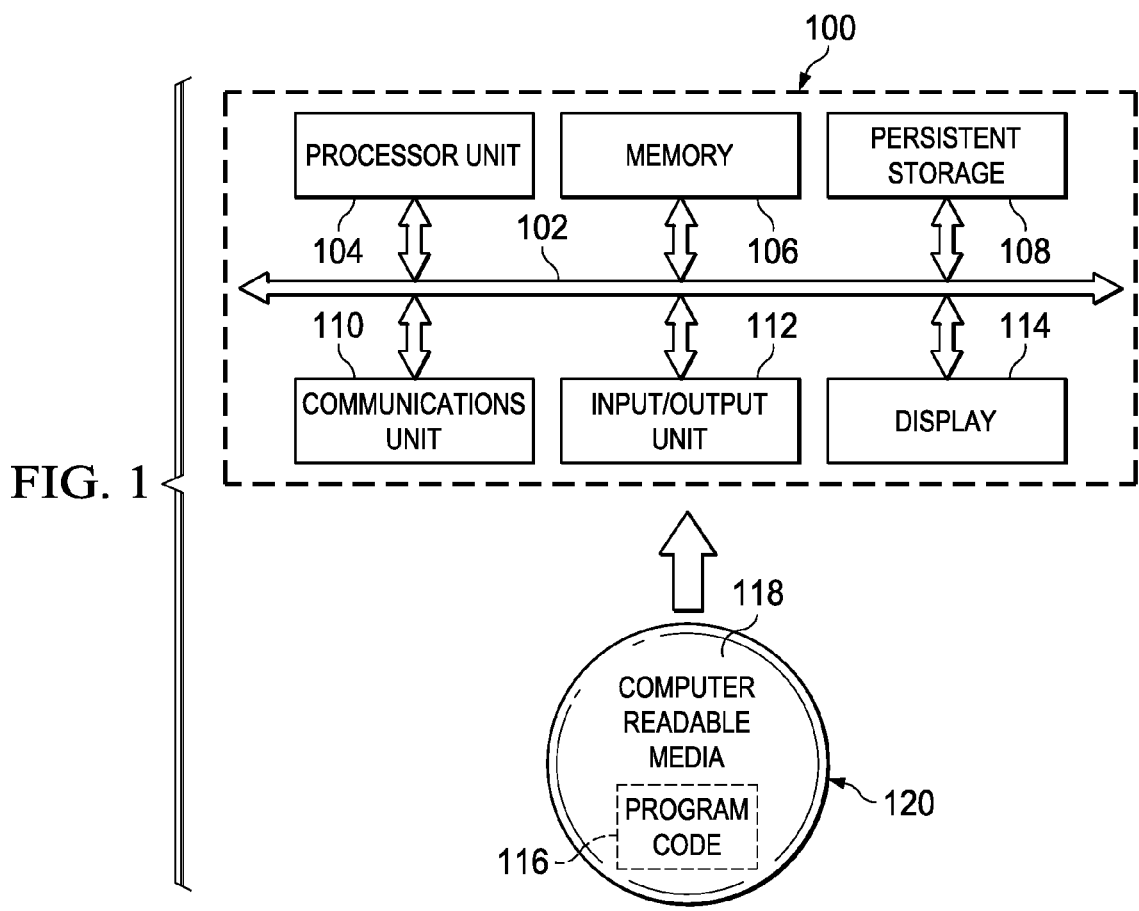
FIG. 1 is a block diagram of a data processing system in which illustrative embodiments may be implemented.

As will be appreciated by one skilled in the art, the illustrative embodiments may be embodied as a system, method or computer program product. Accordingly, the illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the illustrative embodiments may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to embodiments of the illustrative embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Figure 2:
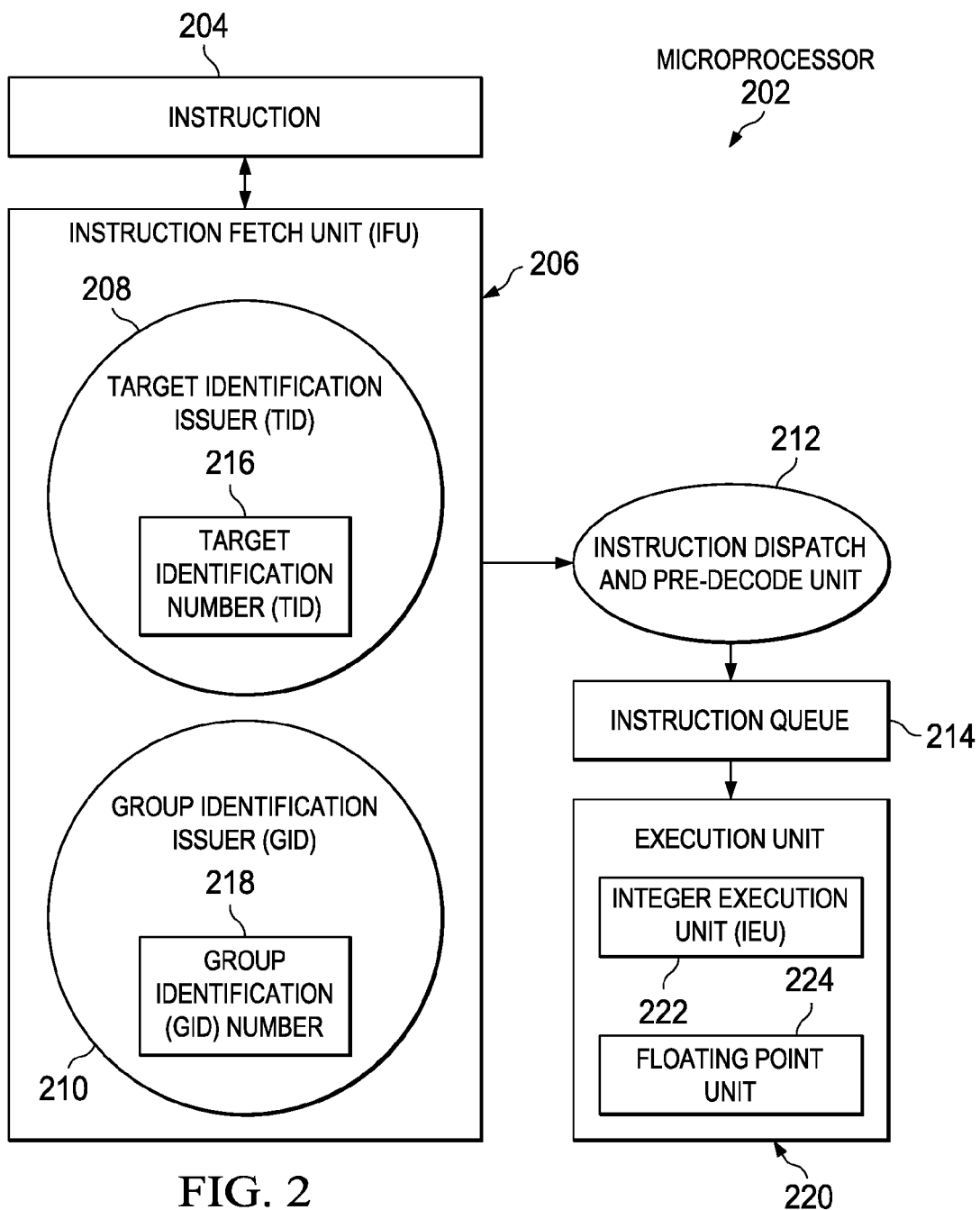
FIG. 2 is a block diagram of illustrating components for assigning a group identification number and a target identification number for each instruction in an instruction stream in accordance with an illustrative embodiment.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type. Microprocessor 202 from FIG. 2 is an exemplary embodiment of processing unit 104 located in FIG. 1.

Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Modern microprocessors, also known as central processing units (CPUs), accomplish computer-related tasks by executing instructions stored within the central processing units (CPUs). However, a major difficulty for modem microprocessors is keeping order of a dispatched sequence between the dispatched and the executed instruction stream. The illustrative embodiments thus provide a computer implemented method and apparatus for maintaining an out of order instruction stream.

In one embodiment, the method and apparatus include assigning a group identification number (GID) and a target identification number (TID) to an instruction in an instruction stream. The group identification number (GID) and the target identification number (TID) are labeled inside an instruction fetcher unit. The group identification number (GID) and the target identification number (TID) are pre-decoded. Pre-decoding refers to the process of decoding an instruction before dispatching the instruction to an instruction queue. This decoding may occur, for example, by at least a half cycle or one cycle before the instruction is dispatched. Decoding involves converting data contained in an instruction back into an executable format that can control the logic circuit directly.

The instruction is sent to an instruction queue. The instruction is re-ordered in the instruction stream after executing the instruction utilizing information from the pre-decoding of the group identification number (GID) and the target identification number (TID).

FIG. 2 is a block diagram illustrating components for managing out of order executing and retirement of instructions in a microprocessor in accordance with an illustrative embodiment. FIG. 2 consists of microprocessor 202. As previously stated, microprocessor 202 is an example of processing unit 104 in FIG. 1. Microprocessor 202 is an example of a central processing unit (CPU), such as processing unit 104, contained on a single integrated circuit.

An example of microprocessor 202 includes, without limitation, a Reduced Instruction Set Computer central processing unit, also known as RISC CPU. Reduced Instruction Set Computers (RISC) CPUs are usually superscalar, which essentially means that several execution units are included in the central processing unit (CPU) that allow instructions to be fetched and executed in parallel. Higher performance is thus achieved by executing multiple instructions in parallel. Modern microprocessors, such as the Reduced Instruction Set Computer central processing unit (RISC CPU), are also known in the art as high-performance microprocessors. The architecture consists of multiple functional units, each capable of independent execution, with source and result operands delivered via local interconnection busses. Superscalar processors are capable of performing out of order execution and out of order retirement for a set of instructions.

Out of order execution occurs within a Reduced Instruction Set Computer central processing unit (RISC CPU), because this type of microprocessor allows for multiple instructions to be executed in parallel through a multiple staged process. The internal timing of a Reduced Instruction Set Computer central processing unit (RISC CPU) typically operates along a multiple staged pipelined process.

Pipeline processing refers to a category of techniques that provide simultaneous, or parallel, processing within the computer. Pipeline processing refers to overlapping operations by moving data or instructions into a conceptual pipe with all stages of the pipe processing simultaneously. For example, while one instruction is being executed, the computer can be decoding the next instruction.

In a multiple staged pipeline process, five multiple stages are typically included. These stages include fetching a set of instructions, dispatching and pre-decoding the set of instructions, executing the set of instructions, performing a completion buffer stage, and a write back stage.

Fetching an instruction involves retrieving an instruction from program memory. An instruction is usually represented by a number or a sequence of numbers. After the instruction fetch, the instructions are dispatched to an instruction queue, such as instruction queue 214. Instruction queue 214 may also be termed an instruction buffer or reservation station. The instruction waits in instruction queue 214 until the instruction's input operands are available. The instruction is then allowed to leave instruction queue 214 before earlier, older instructions.

During the dispatching and predecoding stage, the instructions may be dispatched either in-order or out of order. Instruction dispatch and pre-decode unit 212 assists in the dispatching and pre-decoding process.

During the execution stage, the instructions that are dispatched are executed by different units at the same time. During the completion buffer stage, the executed instruction streams are put back into the original order that the instructions were issued in. During the write back stage, the executed results are written into targeted registers and memory.

Microprocessor 202 is capable of performing out of order execution. Out of order execution allows a ready instruction to be processed while an older instruction waits on the cache, then re-orders the results to appear that everything happened in the programmed order. Out-of-order execution is a feature of high-performance microprocessors, such as a Reduced Instruction Set Computer central processing unit (RISC CPU). This type of processing allows a processor to avoid a class of stalls that occurs when the data needed to execute a set of instructions is unavailable due to missing data. By contrast, an in-order processor requires that input operands be available before an instruction can be dispatched to an appropriate functional unit. In an in-order processor, if one or more operands are unavailable during the current clock cycle, the in-order processor stalls until the operands become available.

For an out of order dispatch, an instruction stream may be composed of instruction 1, instruction 2, instruction 3, and instruction 4. However, due to the pipeline processing of the microprocessor, instruction 3 may be dispatched before instruction 1 and sent to an instruction queue. Thus, the instructions are out of order.

Out of order retirement is the process whereby instructions are rearranged in the same order as when the instruction stream is originally issued. Retiring an instruction occurs during the completion buffer stage. In a superscalar microprocessor, such as microprocessor 202, after the instructions are allowed to wait in the instruction queue, the instruction is issued to the appropriate functional unit and executed by that unit. The results from the execution of the instruction are then queued.

Within microprocessor 202 is located instruction fetch unit (IFU) 206. Instruction fetch unit 206 retrieves instructions within microprocessor 202. Instruction fetch unit 206 is used during the instruction fetch stage. In the illustrative embodiments, target identification number (TID) issuer 208 and group identification number (GID) issuer 210 are included within instruction fetch unit 206. Target identification number issuer 208 and group identification number issuer 210 are designed as "intelligent counters" that can be implemented as state machines in the integrated circuits design phase. A state machine is typically a system modeled to respond to a certain event or transition.

Group identification number issuer 210 is designed as a sequential counter from zero to sixty-three. Target identification number issuer 208 is designed as a logically controlled state machine that depends on the instruction pre-decode logic.

Target identification number 216 is a number assigned to every instruction within an instruction stream. Target identification number 216 is issued linearly to identify the original instruction stream sequence. In one embodiment, target identification number 216 is within a range from zero to sixty-three. Target identification number 216 also indicates which unit within microprocessor 202 an instruction is issued to. Target identification number 216 will be reset after all of the instructions assigned to a group having the same group identification number are completely executed and retired.

Group identification number 218 is another type of identification tag for an instruction. Group identification number 218 is issued according to the group of instructions being dispatched in a particular cycle. Group identification number 218 is assigned sequentially. In one embodiment, group identification number 218 is within a range of zero to sixty-four.

The target identification number 216 assists the dispatch unit, such as instruction dispatch and pre-decode unit 212. Group identification number 218 assists the completion buffer stage of the pipeline process. By assigning two additional identification tags to every instruction and pre-decoding these identification tags prior to the instruction queue in every execution block, out of order dispatched instruction streams are returned to their original order even after out of order retirement. One of the advantages of the illustrative embodiment, is that memory resource conflicts and synchronization problems can be avoided.

Once target identification number 216 and the group identification number 218 are assigned in the instruction fetch unit 206 to instruction 204, instruction 204 is sent to instruction dispatch and pre-decode unit 212, which is usually the dispatch unit in a processor. Instruction dispatch and pre-decode unit 212 partially pre-decodes instruction 204 to decode target identification number 216 and group identification number 218 prior to sending the instruction to the instruction queue. Once these two identification tags are decoded, instruction 204 is sent to instruction queue 214 to wait for execution. In one embodiment, the instruction is pre-decoded and then sent to the real instruction FIFO (First In First Out) register. The instruction is then executed.

During the completion buffer stage, the instruction status is queued in the same order of the instruction queue inside the execution units for the pre-decoding mechanism. Thus, during the completion buffer stage, a reordering mechanism is able to put the instructions back in the original order that the instructions were issued in, with the help of group identification number issuer 208 and target identification number issuer 210.

The pre-decoding of the target identification number and the group identification number is embedded inside every major execution unit. The information provided from the embedding of the target identification number and the group identification number in every major execution unit provides a greater ability to determine the position of an instruction within an instruction stream, even if the instruction is executed out-of-order. Target identification number 216 and group identification number 218 are tagged throughout the process so that the instruction steams are clearly marked with their original sequence at every stage in the set of stages for processing the instruction streams.

During the execution and retirement stage, the pre-decoded instruction is sent from instruction fetch unit 206 to an execution unit within the microprocessor for executing the instruction, such as execution unit 220. The pre-decoded instruction is sent one cycle earlier than the fully decoded instruction itself. In one illustrative embodiment, every instruction has to be correctly moved back to order after being pushed out of an arithmetic logic unit (ALU) in microprocessor 202 in accordance with the target identification number and the group identification number, after the instruction has been tagged and queued.

There are two flows for consideration throughout the illustrative embodiments. The first flow is a data processing pipeline. The second flow is the instruction stream flow. Target identification number 216 correlates to the data processing pipeline and group identification number 218 correlates to the instruction stream flow. After instructions are pre-decoded and dispatched, classified instruction streams are fed into an execution unit, such as execution unit 220. Example of execution unit 220 is integer execution unit (IEU) 222 and floating point unit (FPU) 224. Other types of instructions are fed into a bus interface unit for access. The data processing pipeline is primarily handled by the vector register file, integer execution unit 222, and floating point unit 224.

In one embodiment, instruction 204 in microprocessor 202 is sent to instruction fetch unit 206. In instruction fetch unit 206, instruction 206 is assigned a target identification number and a group identification number, such as target identification number 216 and group identification number 218. Target identification number 216 provides an additional identifier to instruction that indicates the appropriate execution unit in microprocessor 202 to send an instruction, such as instruction 204. Group identification number 218 is an identifier indicating the instruction set that instruction 204 belonged to.

Once instruction 204 is assigned target identification number 216 and group identification number 218, instruction 204 is dispatched or sent to instruction dispatch and pre-decode unit 212 to be pre-decoded. During the pre-decoding process, instruction 204 is decoded prior to being sent to instruction queue 214. The pre-decoding process includes decoding information associated with target identification number 216 and group identification 218.

Instruction 204 is dispatched from instruction dispatch and pre-decode unit 212 and sent to instruction queue 214 after the pre-decoding process. Instruction queue 214 is associated with an appropriate execution unit within microprocessor 202 for executing instruction 204 to be executed. Results from execution are then reordered in the out-of-order retirement process.

Figure 3:
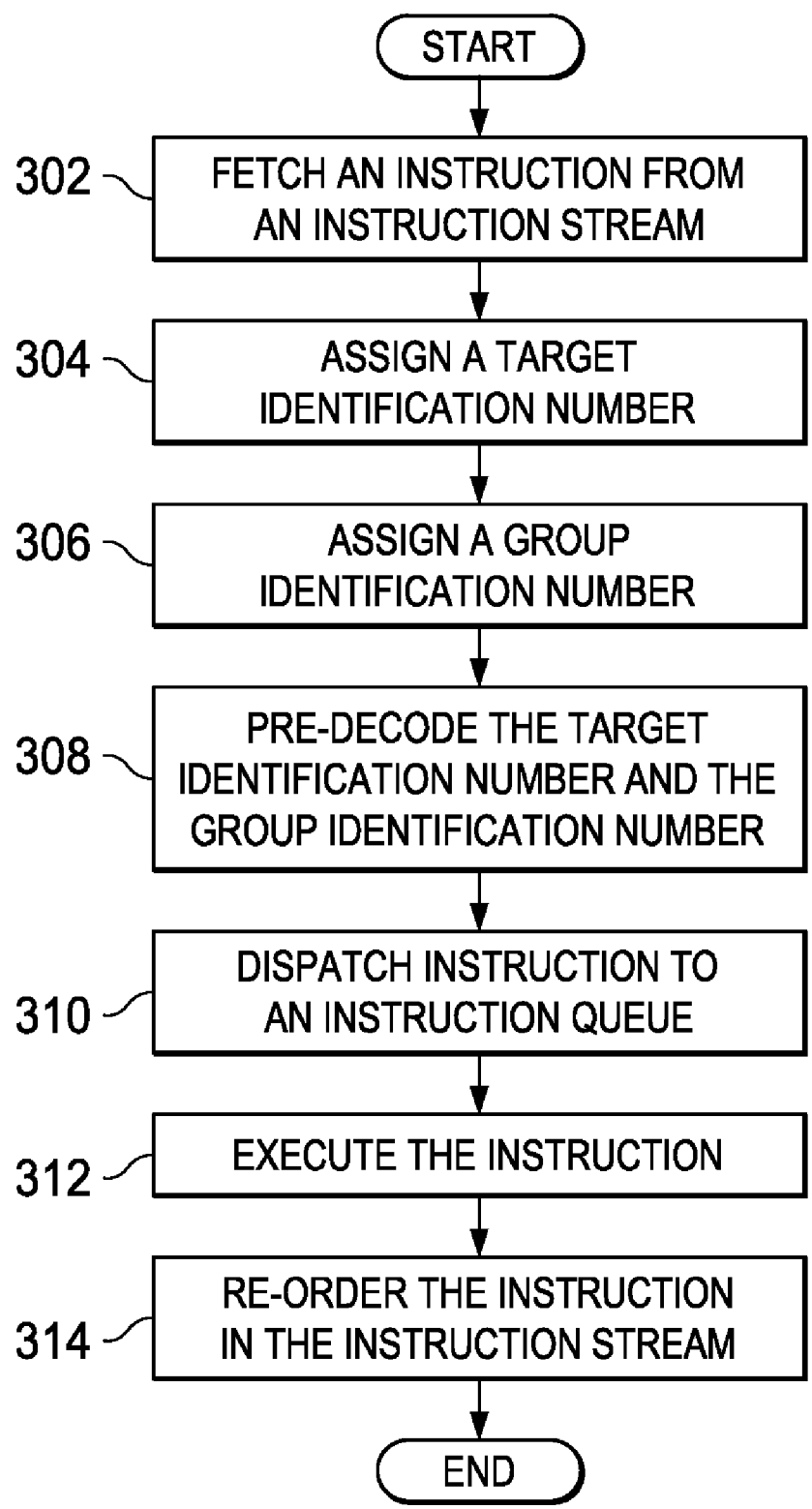
FIG. 3 is a flowchart for managing an out of order instruction stream in accordance with an illustrative embodiment.

FIG. 3 is a flowchart for managing an out of order execution stream in accordance with an illustrative embodiment. The process begins by fetching an instruction from an instruction stream (step 302). An instruction fetch unit such as instruction fetch unit 206 from FIG. 2 fetches the instruction. The process then assigns a target identification number (step 304). Next, the process assigns a group identification number (step 306). A target identification issuer and a group identification issuer, such as target identification issuer 208 and group identification issuer 210, issue the target identification number and the group identification number. Target identification issuer 208 and group identification issuer 210 are located in instruction fetch unit 206 in FIG. 2.

To continue the process, the target identification and the group identification numbers are pre-decoded (step 308). The instruction is dispatched to an instruction queue (step 310). The instruction dispatch and pre-decode unit in a microprocessor may perform steps 308 and 310. The instruction is executed (step 312) in an execution unit of the microprocessor. For example, the instruction may be executed in integer execution unit 222 or floating point unit 224 from FIG. 2. The instruction is then re-ordered in the instruction stream using the target identification number and the group identification number to assist in re-ordering (step 314). The process terminates thereafter.

Turning to FIG. 4, an illustrative algorithm is presented in accordance with an illustrative embodiment. Code 400 is for a process for assigning a unique target identification number and a group identification number for every instruction in an instruction stream. Code 400 is used by an instruction fetch unit, such as instruction fetch unit 206 in FIG. 2, for assigning a target identification number and a group identification number for an instruction.

In one or more illustrative embodiments provide a computer-implemented method and apparatus presented for managing an out of order dispatched instruction queue in a microprocessor. In one embodiment, the method and apparatus include assigning a group identification number and a target identification number to an instruction in an instruction stream. The group identification number and the target identification number are labeled inside an instruction fetcher unit. The group identification number and the target identification number are pre-decoded. The instruction is sent to an instruction queue. The instruction is re-ordered in the instruction stream after executing the instruction utilizing information from the pre-decoding of the group identification number and the target identification number.

The upper section of code 400 describes a process for encoding the instructions with a target identification number and a group identification number, such as target identification number 216 and group identification number 218 from FIG. 2. The lower section of code 400 describes a process for pre-decoding and dispatching the instruction set containing the target identification number and the group identification number. Instruction pre-decode and dispatch unit 212 from FIG. 2 is an exemplary unit for decoding and dispatching the instruction containing the target identification number and the group identification number.

In one or more illustrative embodiments provide a computer-implemented method and apparatus presented for managing an out of order dispatched instruction queue in a microprocessor. In one embodiment, the method and apparatus include assigning a group identification number and a target identification number to an instruction in an instruction stream. The group identification number and the target identification number are labeled after a pre-decoding stage inside an instruction fetcher unit. The group identification number and the target identification number are pre-decoded. The instruction is sent to an instruction queue. The instruction is re-ordered in the instruction stream after executing the instruction utilizing information from the pre-decoding of the group identification number and the target identification number.

The one of more illustrative embodiments provide greater efficiency in re-ordering instructions that were executed out of order in a superscalar microprocessor, such as microprocessor 202 from FIG. 2. By assigning a group identification number and a target identification number, the instruction dispatch unit is better able to intelligently predict which unit to dispatch an instruction to and with which group of instructions.

The illustrative embodiments can take the form of an entirely hardware embodiment, an entirely software embodiment or an embodiment containing both hardware and software elements. In a preferred embodiment, the illustrative embodiments are implemented in software, which includes but is not limited to firmware, resident software, microcode, etc.

Furthermore, the illustrative embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present illustrative embodiments has been presented for purposes of illustration and description, and is not intended to be exhaustive or limited to the illustrative embodiments in the form disclosed. Many modifications and variations will be apparent to those of ordinary skill in the art. The embodiment was chosen and described in order to best explain the principles of the illustrative embodiments, the practical application, and to enable others of ordinary skill in the art to understand the illustrative embodiments for various embodiments with various modifications as are suited to the particular use contemplated.

What is claimed is:

1. A computer-implemented method for managing an out of order dispatched instruction queue in a microprocessor, the computer-implemented method comprising:

fetching, by a superscalar microprocessor capable of out of order execution and out of order retirement, a set of instructions within a plurality of sets of instructions, where the set of instructions is fetched by an instruction fetch unit within the superscalar microprocessor, and wherein each instruction in the set of instructions is represented by a sequence of numbers for identification;

assigning, by the superscalar microprocessor, a group identification number tag and a target identification number tag to each instruction within the set of instructions being processed by the superscalar microprocessor, wherein the assigning of the group identification number tag and the target identification number tag is performed inside the instruction fetch unit, and wherein the group identification number tag and the target identification number tag are identifiers assigned to each instruction within the set of instructions prior to dispatching the set of instructions to an instruction queue, and wherein the group identification number tag is issued to each instruction within a particular set of instructions and is used to indicate which particular set of instructions an instruction belongs to, and wherein the target identification number tag is issued to each instruction within the particular set of instructions and is used to indicate where a particular instruction is sequentially located within an original sequence of the particular set of instructions;

pre-decoding, by the superscalar microprocessor, information associated with the group identification number tag and the target identification number tag for each instruction within the set of instructions one cycle prior to dispatching the set of instructions to the instruction queue to form pre-decoded information, wherein the pre-decoded information associated with the group identification number tag and the target identification number tag is stored in execution units within the superscalar microprocessor;

dispatching, by the superscalar microprocessor, instructions within the set of instructions out of order to the instruction queue; and re-ordering, by the superscalar microprocessor, the instructions within the set of instructions after executing the set of instructions utilizing the pre-decoded information associated with the group identification number tag and the target identification number tag for each instruction within the set of instructions to place the set of instructions back in the original sequence, wherein the target identification number tag is re-set every time all instructions corresponding to a same group identification number are executed and retired.

2. The computer-implemented method of claim 1, wherein the set of instructions are pre-decoded and dispatched to the instruction queue by an instruction dispatch and pre-decode unit.

3. The computer-implemented method of claim 1, wherein the superscalar microprocessor is a Reduced Instruction Set Computer central processing unit (RISC CPU).

4. A computer program product stored on a recordable-type computer readable medium for managing an out of order dispatched instruction queue in a microprocessor, the computer program product comprising:

computer useable program code for fetching, by a superscalar microprocessor capable of out of order execution and out of order retirement, a set of instructions within a plurality of sets of instructions, where the set of instructions is fetched by an instruction fetch unit within the superscalar microprocessor, and wherein each instruction in the set of instructions is represented by a sequence of numbers for identification;

computer useable program code for assigning, by the superscalar microprocessor, a group identification number tag and a target identification number tag to each instruction within the set of instructions being processed by the superscalar microprocessor, wherein the assigning of the group identification number tag and the target identification number tag is performed inside the instruction fetch unit, and wherein the group identification number tag and the target identification number tag are identifiers assigned to each instruction within the set of instructions prior to dispatching the set of instructions to an instruction queue, and wherein the group identification number tag is issued to each instruction within a particular set of instructions and is used to indicate which particular set of instructions an instruction belongs to, and wherein the target identification number tag is issued to each instruction within the particular set of instructions and is used to indicate where a particular instruction is sequentially located within an original sequence of the particular set of instructions;

computer useable program code for pre-decoding, by the superscalar microprocessor, information associated with the group identification number tag and the target identification number tag for each instruction within the set of instructions one cycle prior to dispatching the set of instructions to the instruction queue to form pre-decoded information, wherein the pre-decoded information associated with the group identification number tag and the target identification number tag is stored in execution units within the superscalar microprocessor;

computer useable program code for dispatching, by the superscalar microprocessor, instructions within the set of instructions out of order to the instruction queue; and computer useable program code for re-ordering, by the superscalar microprocessor, the instructions within the set of instructions after executing the set of instructions utilizing the pre-decoded information associated with the group identification number tag and the target identification number tag for each instruction within the set of instructions to place the set of instructions back in the original sequence, wherein the target identification number tag is re-set every time all instructions corresponding to a same group identification number are executed and retired.

5. The computer program product of claim 4, wherein the superscalar microprocessor is a Reduced Instruction Set Computer Central Processing Unit (RISC CPU).

6. A data processing system for managing an out of order dispatched instruction queue in a microprocessor, the data processing system comprising:

a bus system;

a storage device connected to the bus system, wherein computer useable program code is stored on the storage device; and a superscalar microprocessor capable of out of order execution and out of order retirement connected to the bus system, wherein the superscalar microprocessor executes the computer useable program code to:

fetch a set of instructions within a plurality of sets of instructions, where the set of instructions is fetched by an instruction fetch unit within the superscalar microprocessor, and wherein each instruction in the set of instructions is represented by a sequence of numbers for identification;

assign a group identification number tag and a target identification number tag to each instruction within the set of instructions being processed by the superscalar microprocessor, wherein assigning the group identification number tag and the target identification number tag is performed inside the instruction fetch unit, and wherein the group identification number tag and the target identification number tag are identifiers assigned to each instruction within the set of instructions prior to dispatching the set of instructions to an instruction queue, and wherein the group identification number tag is issued to each instruction within a particular set of instructions and is used to indicate which particular set of instructions an instruction belongs to, and wherein the target identification number tag is issued to each instruction within the particular set of instructions and is used to indicate where a particular instruction is sequentially located within an original sequence of the particular set of instructions;

pre-decode information associated with the group identification number tag and the target identification number tag for each instruction within the set of instructions one cycle prior to dispatching the set of instructions to the instruction queue to form pre-decoded information, wherein the pre-decoded information associated with the group identification number tag and the target identification number tag is stored in execution units within the superscalar microprocessor;

dispatch instructions within the set of instructions out of order to the instruction queue; and re-order the instructions within the set of instructions after executing the set of instructions utilizing the pre-decoded information associated with the group identification number tag and the target identification number tag for each instruction within the set of instructions to place the set of instructions back in the original sequence, wherein the target identification number tag is re-set every time all instructions corresponding to a same group identification number are executed and retired.

7. The data processing system of claim 6, wherein the superscalar microprocessor is a Reduced Instruction Set Computer central processing unit (RISC CPU).

* * * * *